US010677321B2

United States Patent
Tsai et al.

(10) Patent No.: US 10,677,321 B2
(45) Date of Patent: Jun. 9, 2020

(54) SPEED REDUCING DEVICE HAVING POWER SOURCE

(71) Applicant: DELTA ELECTRONICS, INC., Taoyuan (TW)

(72) Inventors: Ching-Hsiung Tsai, Taoyuan (TW); Jia-Ming Wu, Taoyuan (TW); Yu-Xian Huang, Taoyuan (TW); Kuo-Yuan Hung, Taoyuan (TW); You-Chiuan Hsu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 182 days.

(21) Appl. No.: 16/013,264

(22) Filed: Jun. 20, 2018

(65) Prior Publication Data

US 2018/0372187 A1 Dec. 27, 2018

Related U.S. Application Data

(60) Provisional application No. 62/524,290, filed on Jun. 23, 2017.

(30) Foreign Application Priority Data

Jun. 19, 2018 (TW) .............................. 107120975 A

(51) Int. Cl.
*F16H 1/32* (2006.01)
*H02K 7/116* (2006.01)
(Continued)

(52) U.S. Cl.
CPC .............. *F16H 1/32* (2013.01); *F16H 57/02* (2013.01); *H02K 7/102* (2013.01); *H02K 7/116* (2013.01);
(Continued)

(58) Field of Classification Search
CPC ...... F16H 1/32; F16H 57/02; F16H 2001/327; F16H 2057/02034; H02K 7/102; H02K 7/116; B60K 17/3467
(Continued)

(56) References Cited

U.S. PATENT DOCUMENTS 5,908,372 A * 6/1999 Janek .................... F16H 1/32
477/162
7,105,964 B2 * 9/2006 Miyazaki ............ F16H 57/0482
310/75 R
(Continued)

FOREIGN PATENT DOCUMENTS

CN 106257099 A 12/2016
DE 102004058551 A1 6/2006
(Continued)

*Primary Examiner* — Leslie A Nicholson, III
(74) *Attorney, Agent, or Firm* — Kirton McConkie; Evan R. Witt

(57) ABSTRACT

A speed reducing device includes a motor and a speed reducing mechanism. The motor includes a stator portion, a shaft portion and rotator portion. The rotator portion includes first and second eccentric rings. The speed reducing mechanism includes first, second and third roller assemblies and first and second cycloid disc sets. These roller assemblies include first rollers, second rollers and third rollers. The first cycloid disc set is mounted around the first eccentric ring, and includes first teeth and second teeth. The second cycloid disc set is mounted around the second eccentric ring, and includes third teeth and fourth teeth. The first teeth are contacted with the first rollers. The third teeth are contacted with the second rollers. The second teeth and the fourth teeth are contacted with the third rollers.

11 Claims, 9 Drawing Sheets

(51) Int. Cl.
*F16H 57/02* (2012.01)
*H02K 7/102* (2006.01)

(52) U.S. Cl.
CPC ................. *F16H 2001/327* (2013.01); *F16H 2057/02034* (2013.01)

(58) Field of Classification Search
USPC ....................................................... 475/162
See application file for complete search history.

(56) References Cited

U.S. PATENT DOCUMENTS

| | | | |
|---|---|---|---|
| 8,403,789 B2* | 3/2013 | Janek | F16H 1/32 475/116 |
| 9,680,347 B2* | 6/2017 | Sherwin | H02K 3/47 |
| 10,520,062 B2* | 12/2019 | Tsai | F16H 1/32 |
| 2016/0029750 A1 | 2/2016 | Ma | |

FOREIGN PATENT DOCUMENTS

| | | |
|---|---|---|
| JP | 2010249208 A | 11/2010 |
| JP | 2011-172455 A | 9/2011 |
| JP | 2011172455 A | 9/2011 |
| JP | 2011229393 A | 11/2011 |
| JP | 2015197158 A | 11/2015 |
| TW | 201627589 A | 8/2016 |
| WO | 2015/086750 A2 | 6/2015 |
| WO | 2016/164486 A1 | 10/2016 |

* cited by examiner

SPEED REDUCING DEVICE HAVING POWER SOURCE

CROSS-REFERENCE TO RELATED APPLICATION

This application claims the benefit of U.S. Provisional Application No. 62/524,290 filed on Jun. 23, 2017, and entitled "POWER GEAR", the entirety of which is hereby incorporated by reference.

FIELD OF THE INVENTION

The present invention relates to a speed reducing device, and more particularly to a speed reducing device having a power source.

BACKGROUND OF THE INVENTION

Generally, a motor is operated at a high speed and a low torsion force. In other words, it is difficult to drive a large-sized load. Consequently, for allowing the motor to drive a heavy object, a reducer is used for reducing the rotating speed of the motor and increasing the torsion force.

Conventionally, the reducer and the motor are separate components. It is necessary to connect the reducer with the motor through an additional connection structure such as a shaft coupling or a gear box. In such way, the volume and weight of the overall structure of the reducer and the motor are increased. In other words, the connection structure for connecting the reducer and the motor cannot be applied to the device that requires light weight and compact space. For example, the connection structure is not suitably applied to an industrial robotic arm or a power assisting device.

Nowadays, some reducers are equipped with motors. Under this circumstance, the shaft coupling or the gear box for connecting the reducer and the motor is omitted. However, since this reducer uses a mono-cycloidal set (i.e., a single cycloid), some drawbacks occur. For example, when the reducer is operated at a high speed, it is difficult to maintain the dynamic balance state. Consequently, the operation of the reducer results in high vibration.

Therefore, there is a need of providing a speed reducing device having a power source in order to the overcome the above drawbacks.

SUMMARY OF THE INVENTION

An object of the present invention provides a speed reducing device comprising a motor and a speed reducing mechanism. The motor and the speed reducing mechanism are combined together without the use of a connection structure (e.g., a shaft coupling or a gear box). Since the motor and the speed reducing mechanism are combined as an integral structure, the weight and volume of the speed reducing device are reduced.

Another object of the present invention provides a speed reducing device having a power source. The speed reducing device is capable of achieving dynamic balance, high rigidness, and high reduction ratio and driving a high load.

In accordance with an aspect of the present invention, there is provided a speed reducing device having a power source. The speed reducing device includes a motor and a speed reducing mechanism. The motor is served as the power source and includes a stator portion, a shaft portion and a rotator portion. The shaft portion is located at a central part of the stator portion. The rotator portion is driven to rotate by the stator portion. The rotator portion includes a rotator casing assembly, a first eccentric ring and a second eccentric ring. The stator portion is accommodated within a hollow structure of the rotator casing assembly. The first eccentric ring and the second eccentric ring are arranged beside each other and protruded from an outer surface of the rotator casing assembly. The speed reducing mechanism is arranged around the motor. The speed reducing mechanism includes a first cycloid disc set, a second cycloid disc set, a first roller assembly, a second roller assembly and a third roller assembly. The first cycloid disc set is mounted around the first eccentric ring, and includes at least one first tooth and at least one second tooth. The second cycloid disc set is mounted around the second eccentric ring, and includes at least one third tooth and at least one fourth tooth. The first roller assembly is arranged beside a first side of the motor, and includes a first reducer casing and plural first rollers. The plural first rollers are arranged on the first reducer casing. The second roller assembly is arranged beside a second side opposing to the first side of the motor, and includes a second reducer casing and plural second rollers. The plural second rollers are arranged on the second reducer casing. The third roller assembly is arranged between the first roller assembly and the second roller assembly. The motor is covered by the first roller assembly, the second roller assembly and the third roller assembly collaboratively. The third roller assembly includes a ring-shaped structure and plural third rollers. The plural third rollers are installed on the ring-shaped structure. The first tooth is contacted with the at least one corresponding first roller, the third tooth is contacted with the at least one corresponding second roller. The second tooth and the fourth tooth are contacted with the at least one corresponding third roller.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
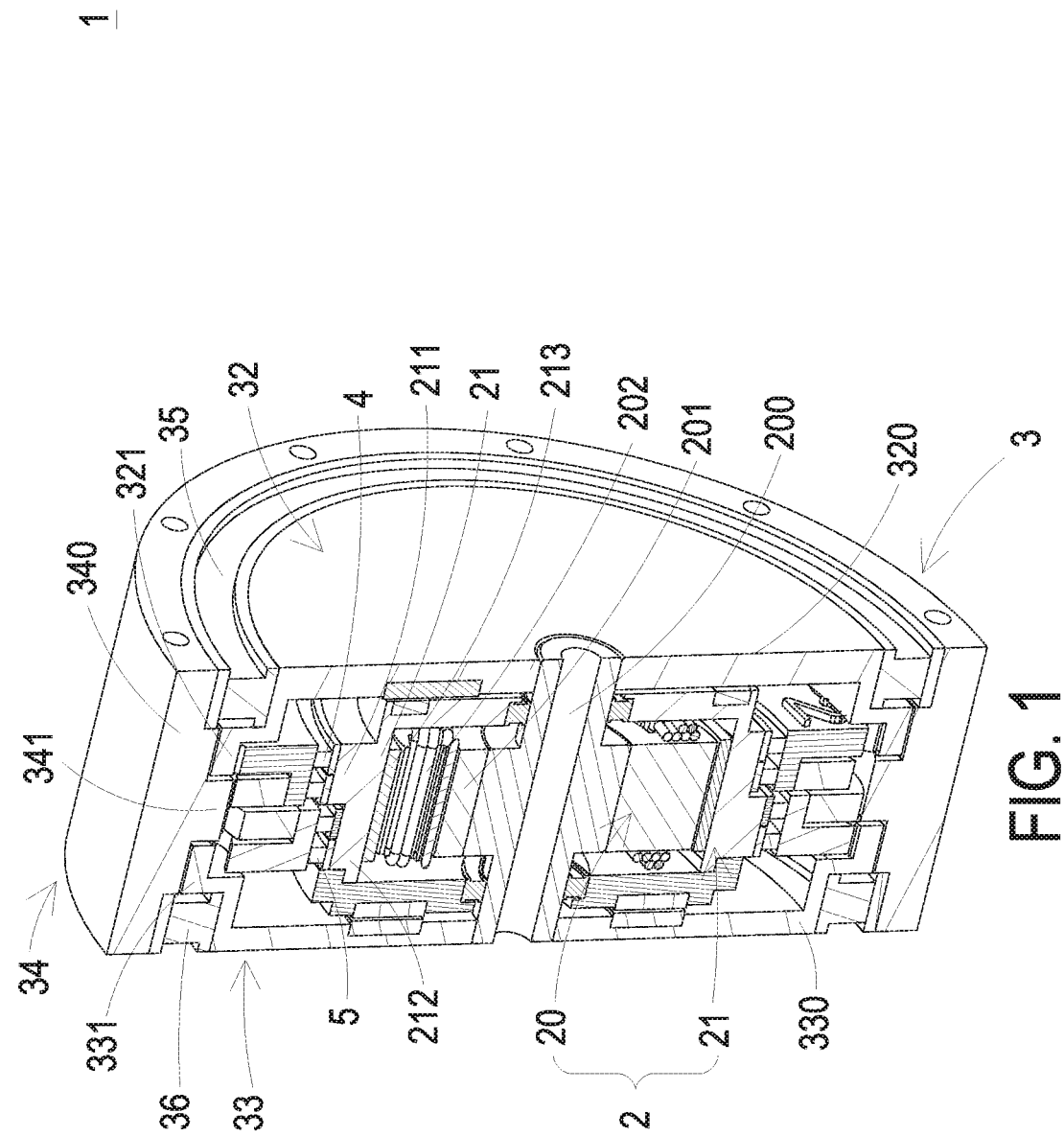
FIG. 1 is a schematic cutaway view illustrating a speed reducing device having a power source according to a first embodiment of the present invention.
Figure 2:
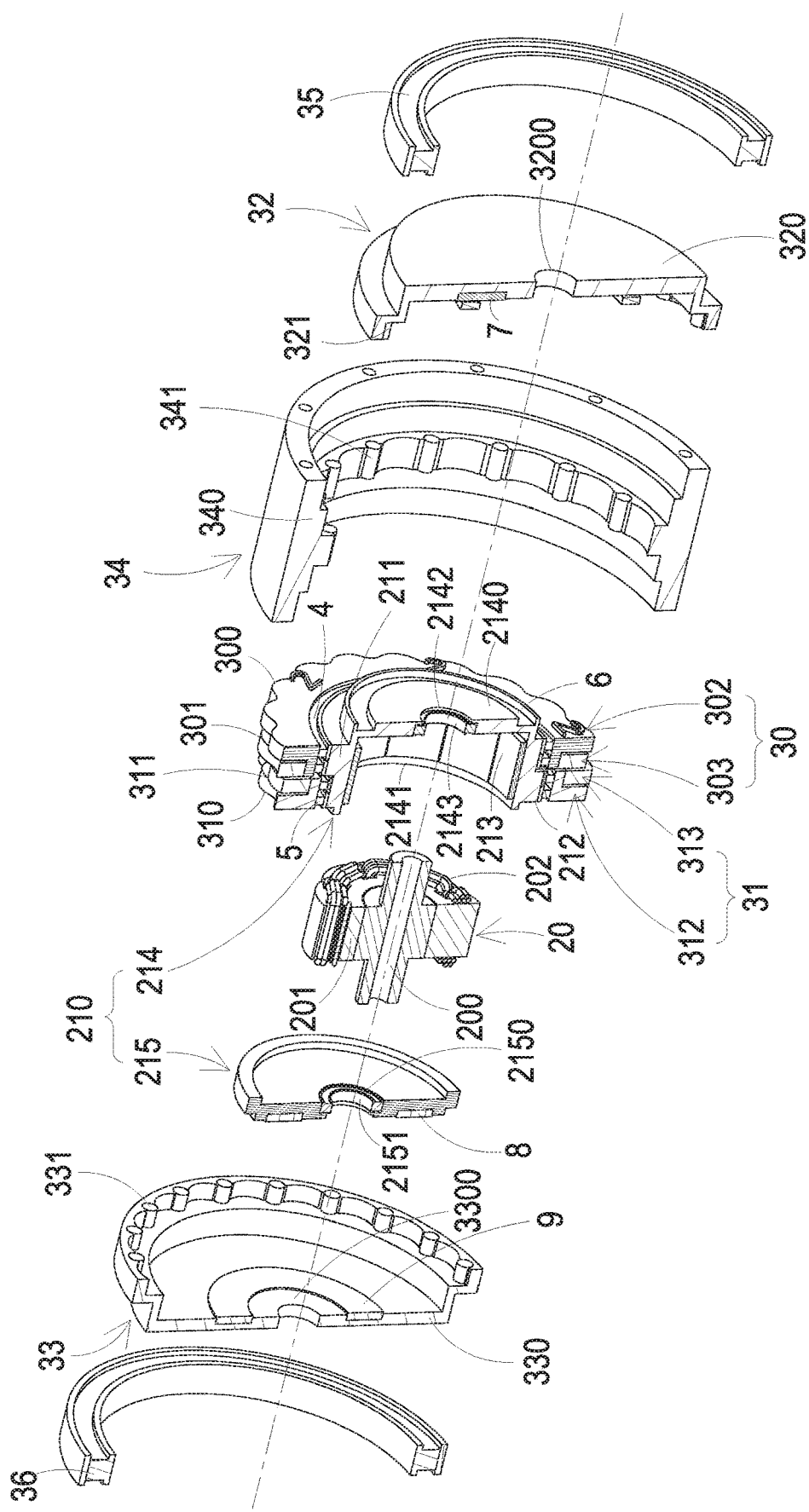
FIG. 2 is a schematic exploded view illustrating the speed reducing device of FIG. 1.
Figure 3:
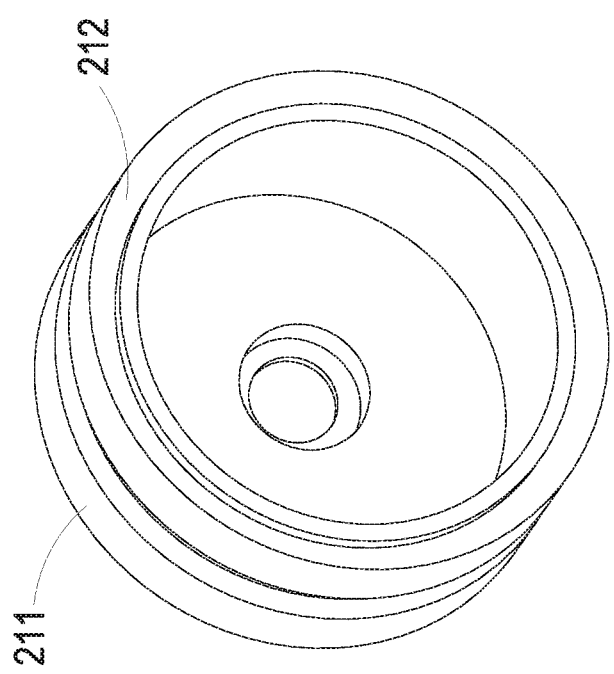
FIG. 3 is a schematic perspective view illustrating a rotator portion of a motor of the speed reducing device of FIG. 1.

Please refer to FIGS. 1, 2 and 3. FIG. 1 is a schematic cutaway view illustrating a speed reducing device having a power source according to a first embodiment of the present invention. FIG. 2 is a schematic exploded view illustrating the speed reducing device of FIG. 1. FIG. 3 is a schematic perspective view illustrating a rotator portion of a motor of the speed reducing device of FIG. 1. The speed reducing device having a power source 1 (hereinafter referred to as the speed reducing device 1) can be applied to various power mechanical devices such as industrial robotic arms or power assisting devices in order to provide a speed reducing function.

In this embodiment, the speed reducing device 1 is a two-stage cycloid reducer. The speed reducing device 1 comprises a motor 2 and a speed reducing mechanism 3. The motor 2 is served as a power source.

In an embodiment, the motor 2 is disposed within the speed reducing mechanism 3. For example, the motor 2 is a radial-flux motor. The motor 2 comprises a shaft portion 200, a stator portion 20 and a rotator portion 21. The stator portion 20 is located at the inner side of the overall motor 2. The shaft portion 200 is located at the central part of the stator portion 20. The rotator portion 21 is located at the outer side of the overall motor 2. Moreover, the rotator portion 21 comprises a rotator casing bearing set, which will be described later. The rotator casing bearing set is mounted around the shaft portion 200. During the operation of the motor 2, the rotator portion 21 is driven by the stator portion 20 in response to the magnetic force between the rotator portion 21 and the stator portion 20. Consequently, the rotator portion 21 is rotated through the rotator casing bearing set. In this embodiment, the rotator portion 21 comprises a rotator casing assembly 210, a first eccentric ring 211 and a second eccentric ring 212. The rotator casing assembly 210 has a hollow structure for accommodating the stator portion 20. When the stator portion 20 is accommodated within the hollow structure of the rotator casing assembly 210, a first end and a second end of the shaft portion 200 are respectively protruded out from the two opposite sides of the rotator casing assembly 210. The first eccentric ring 211 and the second eccentric ring 212 are arranged beside each other and protruded from an outer surface of the rotator casing assembly 210. When the rotator portion 21 is rotated, the first eccentric ring 211 and the second eccentric ring 212 are eccentrically rotated relative to the shaft portion 200. The eccentric direction of the first eccentric ring 211 and the eccentric direction of the second eccentric ring 212 are opposite to each other.

The stator portion 20 further comprises an iron core assembly 201 and a coil assembly 202. The iron core assembly 201 is arranged around the shaft portion 200. The coil assembly 202 is wound around the iron core assembly 201. The rotator portion 21 further comprises at least one magnet 213. For example, the magnet 213 is an arc-shaped magnet or a ring-shaped magnet. The magnet 213 is attached on an inner surface of the hollow structure of the rotator casing assembly 210. The magnet 213 interacts with the coil assembly 202 of the stator portion 20 to generate a magnetic force. In response to the magnetic force, the rotator portion 21 is driven to rotate by the magnet 213.

The speed reducing mechanism 3 is arranged around the motor 2. Moreover, the speed reducing mechanism 3 is assembled with the motor 2 to enclose the motor 2. In an embodiment, the speed reducing mechanism 3 comprises a first cycloid disc set 30, a second cycloid disc set 31, a first roller assembly 32, a second roller assembly 33, a third roller assembly 34, a first reducer outer bearing 35 and a second reducer outer bearing 36.

The first roller assembly 32 is arranged beside a first side of the motor 2. The first roller assembly 32 comprises a first reducer casing 320 and plural first rollers 321. The plural first rollers 321 are circumferentially and discretely arranged on the first reducer casing 320. The first reducer casing 320 further comprises a first fixing hole 3200. The first fixing hole 3200 is aligned with the first end of the shaft portion 200. The first end of the shaft portion 200 is inserted into and fixed in the first fixing hole 3200.

The second roller assembly 33 is arranged beside a second side of the motor 2, wherein the first side and the second side of the motor 2 are opposite to each other. The second roller assembly 33 comprises a second reducer casing 330 and plural second rollers 331. The plural second rollers 331 are circumferentially and discretely arranged on the second reducer casing 330. A center of the second reducer casing 330 further comprises a second fixing hole 3300. The second fixing hole 3300 is aligned with the second end of the shaft portion 200. The second end of the shaft portion 200 is inserted into and fixed in the second fixing hole 3300.

The third roller assembly 34 is arranged between the first roller assembly 32 and the second roller assembly 33. The motor 2 is covered by the first roller assembly 32, the second roller assembly 33 and the third roller assembly 34 collaboratively. The third roller assembly 34 comprises a ring-shaped structure 340 and plural third rollers 341. The plural third rollers 341 are circumferentially and discretely arranged on an inner surface of an accommodation space of the ring-shaped structure 340. The size of the accommodation space of the ring-shaped structure 340 substantially matches the overall size of the first reducer casing 320, the second reducer casing 330 and the motor 2. Consequently, the motor 2 is accommodated within the third roller assembly 34. When the motor 2 is covered by the first roller assembly 32, the second roller assembly 33 and the third roller assembly 34, the first reducer casing 320 and the second reducer casing 330 are accommodated within the ring-shaped structure 340 and connected with the ring-shaped structure 340.

The first cycloid disc set 30 is mounted around the first eccentric ring 211. Moreover, the first cycloid disc set 30 comprises at least one first tooth 300 and at least one second tooth 301. In this embodiment, the first cycloid disc set 30 comprises plural first teeth 300 and plural second teeth 301. The second cycloid disc set 31 is mounted around the second eccentric ring 212. Moreover, the second cycloid disc set 31 comprises at least one third tooth 310 and at least one fourth tooth 311. In this embodiment, the second cycloid disc set 31 comprises plural third teeth 310 and plural fourth teeth 311. The first tooth 300 is contacted with the at least one corresponding first roller 321. The third tooth 310 is contacted with the at least one corresponding second roller 331. The second tooth 301 and the fourth tooth 311 are contacted with the at least one corresponding third roller 341 respectively.

The first reducer outer bearing 35 is arranged between the first reducer casing 320 and the ring-shaped structure 340. The second reducer outer bearing 36 is arranged between the second reducer casing 330 and the ring-shaped structure 340.

In some embodiments, the first reducer casing 320 of the first roller assembly 32 and the second reducer casing 330 of the second roller assembly 33 have screw holes (not shown), respectively. Consequently, the first reducer casing 320 and the second reducer casing 330 are connected with other mechanical structures by employing the screws. Moreover, the first roller assembly 32 and the second roller assembly 33 are not rotated. That is, the first roller assembly 32 and the second roller assembly 33 are not rotated about the shaft portion 200. When the rotator portion 21 is rotated, the first cycloid disc set 30 is rotated with the first eccentric ring 211 and the second cycloid disc set 31 is rotated with the second eccentric ring 212. Since the first roller assembly 32 and the second roller assembly 33 are not rotated, the third rollers 341 are pushed against the corresponding second teeth 301 and the corresponding fourth teeth 311. Consequently, the third roller assembly 34 is rotated about the shaft portion 200. Under this circumstance, the ring-shaped structure 340 of the third roller assembly 34 is used as a power output so as to generate and output power. In some other embodiments, the ring-shaped structure 340 of the third roller assembly 34 comprises screw holes (not shown). Consequently, the ring-shaped structure 340 of the third roller assembly 34 is connected with other mechanical structures through the screw holes. In such way, the power can be transmitted to the mechanical structures.

As mentioned above, the motor 2 and the speed reducing mechanism 3 of the speed reducing device 1 are combined as an integral structure. The motor 2 is located at the inner side of the speed reducing device 1 along the radial direction. The speed reducing mechanism 3 is located at the outer side of the speed reducing device 1 along the radial direction. When the rotator portion 21 is rotated, the first cycloid disc set 30 is rotated with the first eccentric ring 211 and the second cycloid disc set 31 is rotated with the second eccentric ring 212. As mentioned above, the first roller assembly 32 and the second roller assembly 33 are not rotatable, but the third roller assembly 34 is rotatable. Consequently, the first cycloid disc set 30 and the second cycloid disc set 31 interact with the first roller assembly 32, the second roller assembly 33 and the third roller assembly 34. In such way, the purpose of reducing the speed in two stages can be achieved. Since it is not necessary to use an additional shaft coupling to connect the motor 2 and the speed reducing mechanism 3, the volume and weight of the speed reducing device 1 are reduced. Moreover, the first cycloid disc set 30 and the second cycloid disc set 31 are installed on the first eccentric ring 211 and the second eccentric ring 212, respectively, wherein the eccentric direction of the first eccentric ring 211 is opposite to the eccentric direction of the second eccentric ring 212. Consequently, the speed reducing device 1 has high rigidity and dynamic balance and is applicable to a high-load circumstance.

In some embodiments, the shaft portion 200 has a hollow inner structure. The coil assembly 202 or other cables (e.g., the signal cable of an encoder) may pass through the hollow inner structure. Consequently, the cable layout of the speed reducing device 1 is simplified.

Please refer to FIGS. 1 and 2 again. The speed reducing device 1 further comprises a first rotator-outer bearing set 4 and a second rotator-outer bearing set 5. The first rotator-outer bearing set 4 is arranged between the first eccentric ring 211 and the first cycloid disc set 30. The second rotator-outer bearing set 5 is arranged between the second eccentric ring 212 and the second cycloid disc set 31. Each of the first rotator-outer bearing set 4 and the second rotator-outer bearing set 5 comprises at least one bearing. For example, as shown in FIGS. 1 and 2, each of the first rotator-outer bearing set 4 and the second rotator-outer bearing set 5 comprises a single bearing. In some other embodiments, each of the first rotator-outer bearing set 4 and the second rotator-outer bearing set 5 comprises plural bearings.

The rotator casing assembly 210 comprises a first rotator casing 214 and a second rotator casing 215. The first rotator casing 214 has a cup-shaped structure with a base part 2140 and a ring-shaped wall part 2141. The inner space of the ring-shaped wall part 2141 defines the hollow structure of the rotator casing assembly 210. The base part 2140 has a first perforation 2142. The first end of the shaft portion 200 is aligned with and inserted into the first perforation 2142. The ring-shaped wall part 2141 is perpendicularly disposed on the base part 2140, and the inner space of the ring-shaped wall part 2141 defines the hollow structure of the rotator casing assembly 210. The stator portion 20 is accommodated within the inner space of the ring-shaped wall part 2141. The magnet 213 is attached on the inner surface of the ring-shaped wall part 2141. The second rotator casing 215 has a circular disc structure. The size of the second rotator casing 215 matches the size of the inner space of the ring-shaped wall part 2141. After the stator portion 20 is accommodated within the first rotator casing 214, the inner space of the ring-shaped wall part 2141 of the first rotator casing 214 is covered by the second rotator casing 215. Consequently, the stator portion 20 is covered by the first rotator casing 214 and the second rotator casing 215 collaboratively. The second rotator casing 215 has a second perforation 2150. The second end of the shaft portion 200 is aligned with and inserted into the second perforation 2150. As mentioned above, the rotator portion 21 further comprises a rotator casing bearing set. In an embodiment, the rotator casing bearing set comprises a first rotator casing bearing 2143 and a second rotator casing bearing 2151. The first rotator casing bearing 2143 is received within the first perforation 2142 and mounted around the first end of the shaft portion 200. The second rotator casing bearing 2151 is received within the second perforation 2150 and mounted around the second end of the shaft portion 200.

The first cycloid disc set 30 further comprises a first outer cycloid disc 302 and a first inner cycloid disc 303. The second cycloid disc set 31 further comprises a second outer cycloid disc 312 and a second inner cycloid disc 313. The first outer cycloid disc 302 and the first inner cycloid disc 303 are arranged side by side. The first inner cycloid disc 303 is arranged between the first outer cycloid disc 302 and the second inner cycloid disc 313. The first tooth 300 is protruded from an outer periphery of the first outer cycloid disc 302. The second tooth 301 is protruded from an outer periphery of the first inner cycloid disc 303. The second outer cycloid disc 312 and the second inner cycloid disc 313 are arranged side by side. The second inner cycloid disc 313 is arranged between the first inner cycloid disc 303 and the second outer cycloid disc 312. The third tooth 310 is protruded from an outer periphery of the second outer cycloid disc 312. The fourth tooth 311 is protruded from an outer periphery of the second inner cycloid disc 313. The tooth profile of the at least one first tooth 300 on the first outer cycloid disc 302 and the tooth profile of the at least one third tooth 310 on the second outer cycloid disc 312 are identical. The tooth profile of the at least one second tooth 301 on the first inner cycloid disc 303 and the tooth profile of the at least one fourth tooth 311 on the second inner cycloid disc 313 are identical. The number of the at least one first tooth 300 and the number of the at least one third tooth 310 are equal. The number of the at least one second tooth 301 and the number of the at least one fourth tooth 311 are equal. Moreover, the first outer cycloid disc 302 and the first inner cycloid disc 303 are fixedly connected with each other. The second outer cycloid disc 312 and the second inner cycloid disc 313 are fixedly connected with each other. In some embodiments, the plural first rollers 321, the plural second rollers 331 and the plural third rollers 341 are rotatable on their own axles (i.e., self-rotation).

The number of the first rollers 321 of the first roller assembly 32 is equal to the number of the second rollers 331 of the second roller assembly 33. The number of the first rollers 321 is at least one more than the number of the at least one first tooth 300, the number of the second rollers 331 is at least one more than the number of the at least one third tooth 310, and the number of the third rollers 341 of the third roller assembly 34 is at least one more than the number of the at least one second tooth 301 or the number of the at least one fourth tooth 311.

In some embodiments, the speed reducing device 1 further comprises a first braking element 8 and a second braking element 9. The first braking element 8 is disposed on a lateral surface of the second rotator casing 215 of the rotator casing assembly 210 and arranged beside the second roller assembly 33. The second braking element 9 is disposed on a lateral surface of the second reducer casing 330 and arranged beside the second rotator casing 215. The first braking element 8 and the second braking element 9 are selectively separated from each other or contacted with each other. When the first braking element 8 and the second braking element 9 are contacted with each other, the rotation of the rotator portion 21 is limited by the first braking element 8 and the second braking element 9. When the first braking element 8 and the second braking element 9 are separated from each other, the rotation of the rotator portion 21 is allowed.

In an embodiment, the speed reducing device 1 further comprises an encoder. During the rotation of the rotator portion 21 of the motor 2, the encoder detects the angle or displacement of the rotator portion 21. The encoder comprises a signal source 6 and a signal receiver 7. The signal source 6 is installed on a side of the base part 2140 of the first rotator casing 214 of the rotator casing assembly 210. The signal receiver 7 is installed on a side of the first reducer casing 320 of the first roller assembly 32 and arranged beside the signal source 6. The signal source 6 emits a detection signal to the signal receiver 7. During the rotation of the rotator portion 21 of the motor 2, the cooperation of the signal source 6 and the signal receiver 7 detects the angle or the displacement of the rotator portion 21.

The principles of achieving the desired reduction ratio by using the speed reducing device 1 will be described as follows. For example, the number of the first rollers 321 of the first roller assembly 32 is N, the number of the second rollers 331 of the second roller assembly 33 is N, and the number of the third rollers 341 of the third roller assembly 34 is M. The number of the at least one first tooth 300 is A, the number of the at least one third tooth 310 is A, the number of the at least one second tooth 301 is B, and the number of the at least one fourth tooth 311 is B. While the rotator portion 21 of the motor 2 is rotated, the first eccentric ring 211 and the second eccentric ring 212 installed on the rotor portion 21 are synchronously rotated with the rotator portion 21. As the first eccentric ring 211 and the second eccentric ring 212 are rotated, the first rollers 321 of the first roller assembly 32 contacted with the first teeth 300 are not rotatable about the shaft portion 200 and the second rollers 331 of the second roller assembly 33 contacted with the third teeth 310 are not rotatable about the shaft portion 200. Since the operations of the first cycloid disc set 30 and the second cycloid disc set 31 are restricted by the above conditions, the rotating speed of the first cycloid disc set 30 (and the second cycloid disc set 31) is (A−N)/A times the rotating speed of the motor 2. That is, a first-stage speed reduction is achieved. Moreover, since the third rollers 341 of the third roller assembly 34 are pushed against the second teeth 301 of the first cycloid disc set 30 and the fourth teeth 311 of the second cycloid disc set 31, the third roller assembly 34 is rotated about the shaft portion 200. As mentioned above, the third rollers 341 are installed on the inner surface of the accommodation space of the ring-shaped structure 340, and the ring-shaped structure 340 of the third roller assembly 34 is used as the power output. Consequently, the rotating speed of the ring-shaped structure 340 is $((A \times M)-(B \times N))/(A \times M)$ times the rotating speed of the motor 2. That is, a second-stage speed reduction is achieved.

In an embodiment, the number of the first rollers 321 is one more than the number of the at least one first tooth 300, the number of the second rollers 331 is one more than the number of the at least one third tooth 310, and the number of the third rollers 341 of the third roller assembly 34 is one more than the number of the at least one second tooth 301 or the number of the at least one fourth tooth 311. That is, the number A of the at least one first tooth 300 is equal to (N−1), the number A of the at least one third tooth 310 is equal to (N−1), the number B of the at least one second tooth 301 is equal to (M−1), and the number B of the at least one fourth tooth 311 is equal to (M−1). Consequently, the rotating speed of the first cycloid disc set 30 (and the second cycloid disc set 31) is 1/(N−1) times the rotating speed of the motor 2. As mentioned above, the ring-shaped structure 340 of the third roller assembly 34 is used as the power output. Consequently, the rotating speed of the ring-shaped structure 340 is $(N-M)/((N-1) \times M)$ times the rotating speed of the motor 2.

Figure 4:
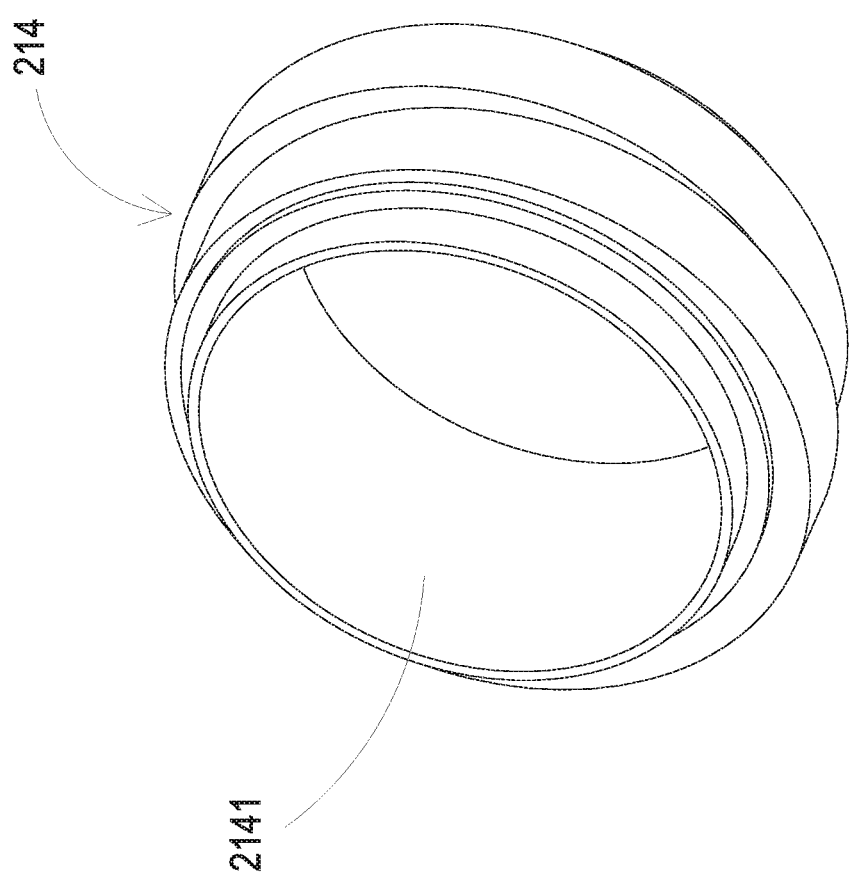
FIG. 4 is a variant example illustrating a partial structure of the rotator portion of the motor of the speed reducing device.

FIG. 4 is a variant example illustrating a partial structure of the rotator portion of the motor of the speed reducing device. In this embodiment, the first rotator casing 214 comprises the ring-shaped wall part 2141. In comparison with FIG. 2, the first rotator casing 214 is not equipped with the base part 2140.

Figure 5:
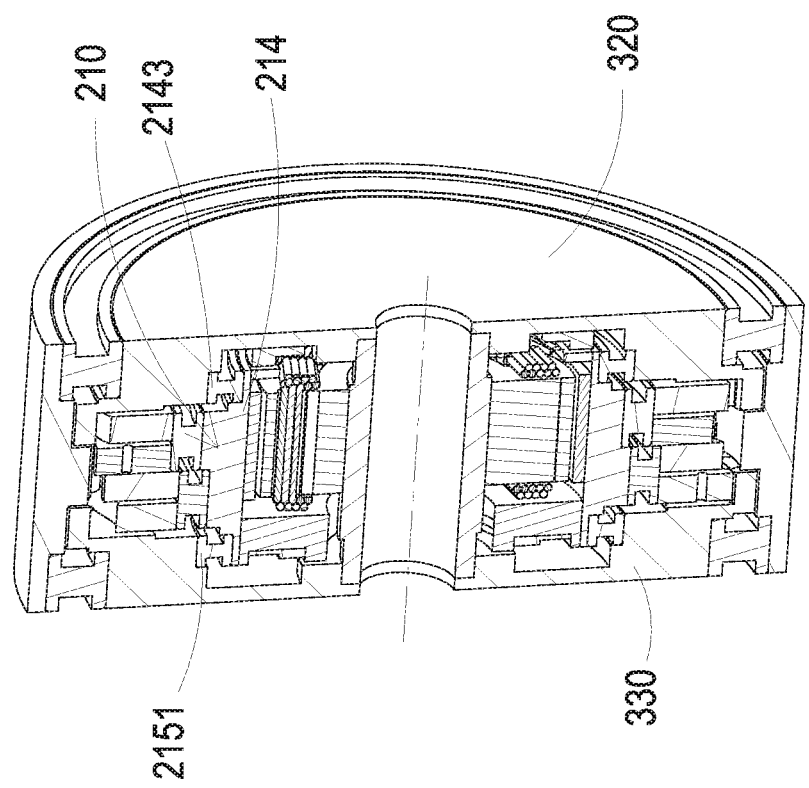
FIG. 5 is a schematic cutaway view illustrating a speed reducing device having a power source according to a second embodiment of the present invention.

FIG. 5 is a schematic cutaway view illustrating a speed reducing device having a power source according to a second embodiment of the present invention. In this embodiment, the rotator portion 21 comprises the first rotator casing 214 as shown in FIG. 4. As shown in FIG. 5, the first rotator casing bearing 2143 of the rotator casing bearing set is arranged between an inner periphery of the first reducer casing 320 and an outer periphery of the rotator casing assembly 210, and the second rotator casing bearing 2151 of the rotator casing bearing set is arranged between an inner periphery of the second reducer casing 330 and the outer periphery of the rotator casing assembly 210. In response to the magnetic interaction between the rotator portion 21 and the stator portion 20, the rotator portion 21 is rotated relative to the stator portion 20 through the rotator casing bearing set.

Figure 6:
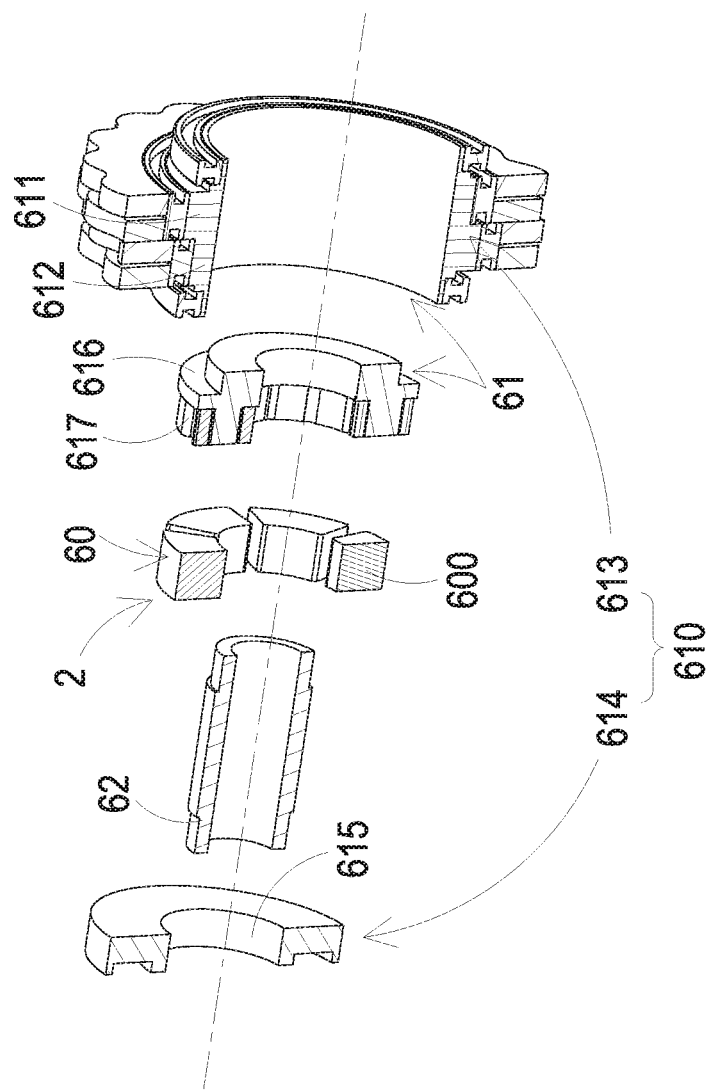
FIG. 6 is a schematic exploded view illustrating a speed reducing device having a power source according to a third embodiment of the present invention.

FIG. 6 is a schematic exploded view illustrating a speed reducing device having a power source according to a third embodiment of the present invention. In this embodiment, the motor 2 is an axial-flux motor. Consequently, the overall thickness of the speed reducing device is reduced. As shown in FIG. 6, the motor 2 comprises a stator portion 60, a rotator portion 61 and a shaft portion 62. The stator portion 60 and the rotator portion 61 are installed on the shaft portion 62. That is, the shaft portion 62 is located at the central parts of the stator portion 60 and the rotator portion 61. In this embodiment, the rotator portion 61 comprises a rotator casing assembly 610, a first eccentric ring 611 and a second eccentric ring 612. The rotator casing assembly 610 has a hollow structure for accommodating the stator portion 60 and a part of the shaft portion 62. When the shaft portion 62 is accommodated within the hollow structure of the rotator casing assembly 610, a first end and a second end of the shaft portion 62 are respectively protruded out from the two opposite sides of the rotator casing assembly 610. The first eccentric ring 611 and the second eccentric ring 612 are arranged beside each other and protruded from an outer surface of the rotator casing assembly 610. When the rotator portion 61 is rotated, the first eccentric ring 611 and the second eccentric ring 612 are eccentrically rotated relative to the shaft portion 62. The eccentric direction of the first eccentric ring 611 and the eccentric direction of the second eccentric ring 612 are opposite to each other.

The stator portion 60 further comprises an iron core assembly 600. The iron core assembly 600 is arranged around the shaft portion 62. The rotator portion 61 further comprises at least one magnet 616 and a coil assembly 617. The coil assembly 617 is sheathed around the magnet 616. For example, the magnet 616 is an arc-shaped magnet or a ring-shaped magnet. The magnet 616 is attached on an inner surface of the hollow structure of the rotator casing assembly 610. The magnet 616 interacts with the stator portion 60 to generate a magnetic force. In response to the magnetic force, the rotator portion 61 is driven to rotate by the magnet 616.

The rotator casing assembly 610 comprises a first rotator casing 613 and a second rotator casing 614. The first rotator casing 613 comprises a ring-shaped wall part. The second rotator casing 614 has a circular disc structure. The size of the second rotator casing 614 matches the size of the inner space of the ring-shaped wall part of the first rotator casing 613. After the stator portion 60 is accommodated within the first rotator casing 613, the inner space of the ring-shaped wall part of the first rotator casing 613 is covered by the second rotator casing 614. Consequently, the stator portion 60 is covered by the first rotator casing 613 and the second rotator casing 614 collaboratively. The second rotator casing 614 has a perforation 615. The second end of the shaft portion 62 is aligned with and inserted into the perforation 615.

Figure 7:
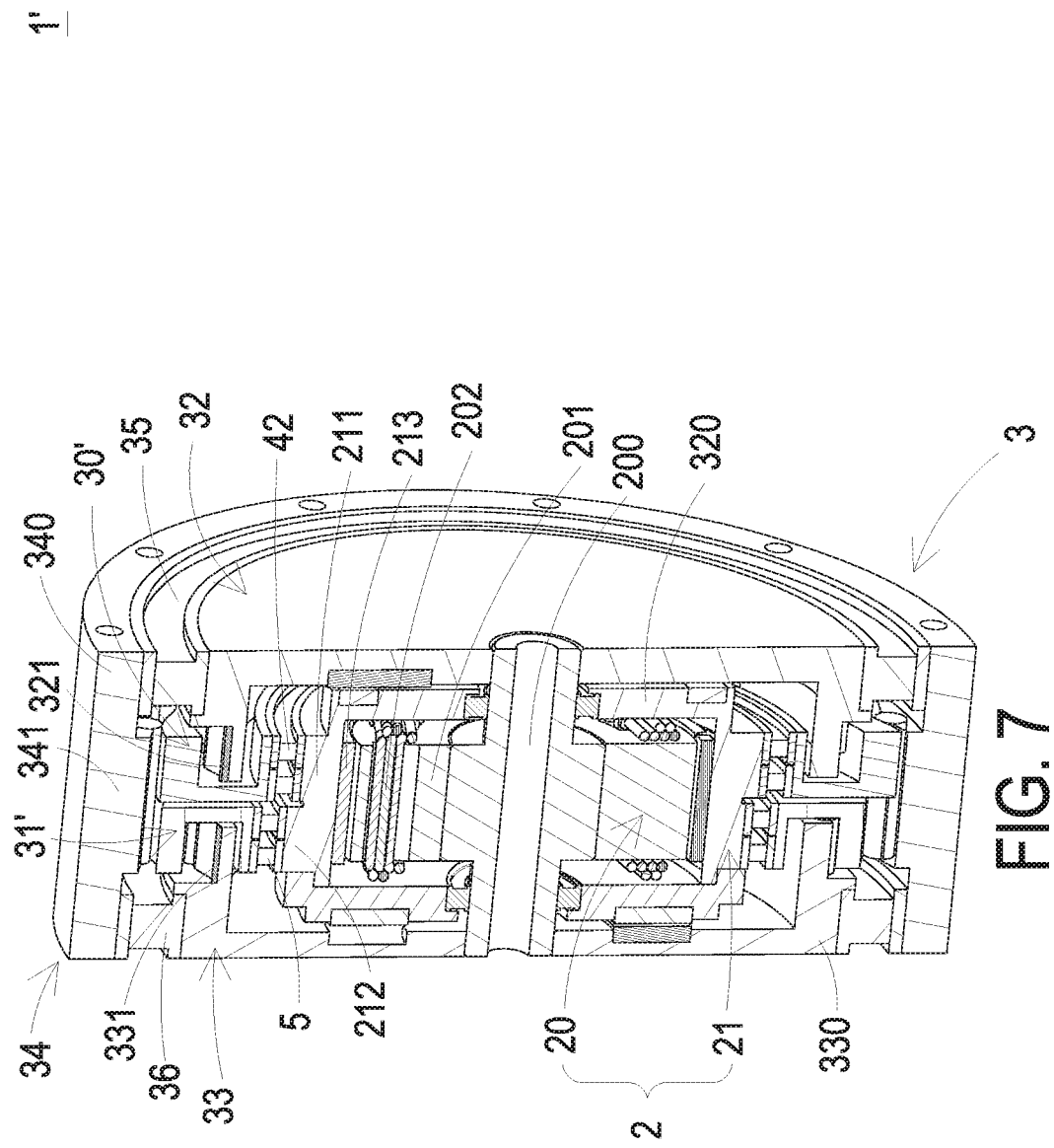
FIG. 7 is a schematic cutaway view illustrating a speed reducing device having a power source according to a fourth embodiment of the present invention.
Figure 8:
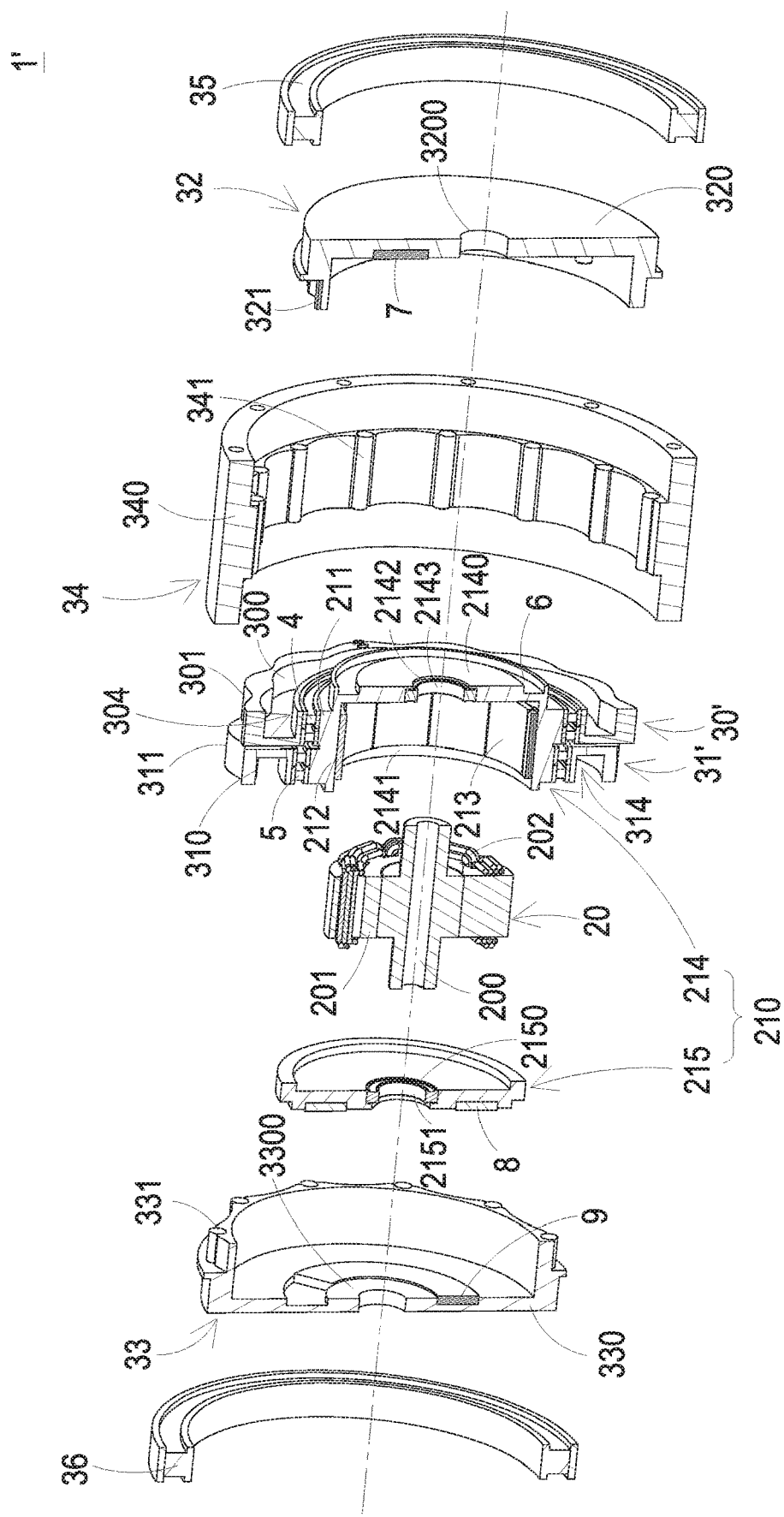
FIG. 8 is a schematic exploded view illustrating the speed reducing device of FIG. 7.
Figure 9:
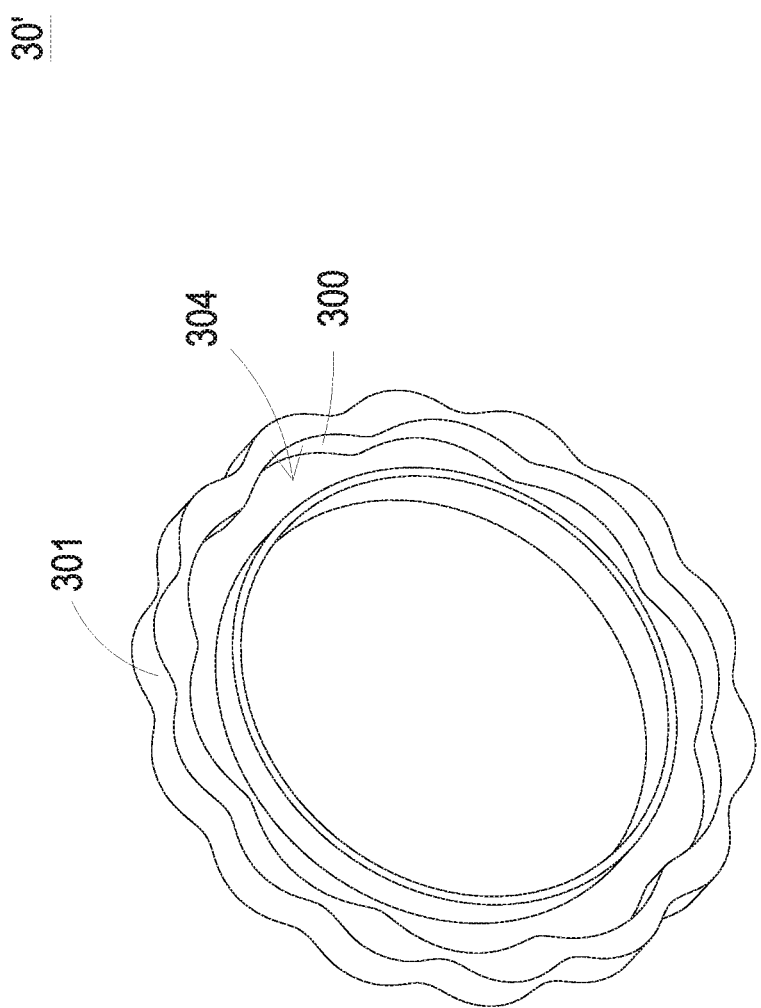
FIG. 9 is a schematic perspective view illustrating a first cycloid disc of the first cycloid disc set of the speed reducing device of FIG. 7.

Please refer to FIGS. 7, 8 and 9. FIG. 7 is a schematic cutaway view illustrating a speed reducing device having a power source according to a fourth embodiment of the present invention. FIG. 8 is a schematic exploded view illustrating the speed reducing device of FIG. 7. FIG. 9 is a schematic perspective view illustrating a first cycloid disc of the first cycloid disc set of the speed reducing device of FIG. 7. The structure, operating principle and reduction ratio of the speed reducing device 1' of this embodiment are similar to those of the first embodiment. Component parts and elements corresponding to those of the first embodiment are designated by identical numeral references, and detailed descriptions thereof are omitted.

In comparison with the first embodiment of FIGS. 1 and 2, the structures of the first cycloid disc set and the second cycloid disc set of this embodiment are distinguished. In this embodiment, the first cycloid disc set comprises a first cycloid disc 30' only, and the second cycloid disc set comprises a second cycloid disc 31' only. The structure of the first cycloid disc 30' and the structure of the second cycloid disc 31' are similar. Consequently, only the structure of the first cycloid disc 30' is shown in FIG. 9. The first cycloid disc 30' comprises a first ring-shaped groove 304 corresponding to the plural first rollers 321. The first tooth 300 of the first cycloid disc 30' is formed on an inner periphery of the first ring-shaped groove 304 and contacted with the corresponding first roller 321. The second tooth 301 of the first cycloid disc 30' is protruded from an outer periphery of the first cycloid disc 30' and contacted with the corresponding third roller 341. The second cycloid disc 31' comprises a second ring-shaped groove 314 corresponding to the plural second rollers 331. The third tooth 310 of the second cycloid disc 31' is formed on an inner periphery of the second ring-shaped groove 314 and contacted with the at least one corresponding second roller 331. The fourth tooth 311 of the second cycloid disc 31' is protruded from an outer periphery of the second cycloid disc 31' and contacted with the at least one corresponding third roller 341. In an embodiment, the number of the at least one first tooth 300 and the number of the at least one second tooth 301 are different, and the number of the at least one third tooth 310 and the number of the at least one fourth tooth 311 are different.

The principles of achieving the desired reduction ratio by using the speed reducing device 1' will be described as follows. For example, the number of the first rollers 321 of the first roller assembly 32 is N, the number of the second rollers 331 of the second roller assembly 33 is N, and the number of the third rollers 341 of the third roller assembly 34 is M. The number of the at least one first tooth 300 is A, the number of the at least one third tooth 310 is A, the number of the at least one second tooth 301 is B, and the number of the at least one fourth tooth 311 is B. While the rotator portion 21 of the motor 2 is rotated, the first eccentric ring 211 and the second eccentric ring 212 installed on the rotator portion 21 are synchronously rotated with the rotator portion 21. As the first eccentric ring 211 and the second eccentric ring 212 are rotated, the first rollers 321 of the first roller assembly 32 contacted with the first teeth 300 are not rotatable about the shaft portion 200 and the second rollers 331 of the second roller assembly 33 contacted with the third teeth 310 are not rotatable about the shaft portion 200. Since the operations of the first cycloid disc set and the second cycloid disc set are restricted by the above conditions, the rotating speed of the first cycloid disc set (and the second cycloid disc set) is $(A-N)/A$ times the rotating speed of the motor 2. That is, a first-stage speed reduction is achieved. Moreover, since the third rollers 341 of the third roller assembly 34 are pushed against the second teeth 301 of the first cycloid disc set and the fourth teeth 311 of the second cycloid disc set, the third roller assembly 34 is rotated about the shaft portion 200. As mentioned above, the third rollers 341 are installed on the inner surface of the accommodation space of the ring-shaped structure 340, and the ring-shaped structure 340 of the third roller assembly 34 is used as the power output. Consequently, the rotating speed of the ring-shaped structure 340 is $((A \times M)-(B \times N))/(A \times M)$ times the rotating speed of the motor 2. That is, a second-stage speed reduction is achieved.

In an embodiment, the number of the first rollers 321 is one more than the number of the at least one first tooth 300, the number of the second rollers 331 is one more than the number of the at least one third tooth 310, and the number of the third rollers 341 of the third roller assembly 34 is one more than the number of the at least one second tooth 301 or the number of the at least one fourth tooth 311. That is, the number A of the at least one first tooth 300 is equal to (N−1), the number A of the at least one third tooth 310 is equal to (N−1), the number B of the at least one second tooth 301 is equal to (M−1), and the number B of the at least one fourth tooth 311 is equal to (M−1). Consequently, the rotating speed of the first cycloid disc set (and the second cycloid disc set) is 1/(N−1) times the rotating speed of the motor 2. As mentioned above, the ring-shaped structure 340 of the third roller assembly 34 is used as the power output. Consequently, the rotating speed of the ring-shaped structure 340 is (N−M)/((N−1)×M) times the rotating speed of the motor 2.

From the above descriptions, the present invention provides a speed reducing device having a power source. The speed reducing device includes a motor and a speed reducing mechanism. The motor and the speed reducing mechanism are combined as an integral structure. The motor is located at the inner side of the speed reducing device along the radial direction. The speed reducing mechanism is located at an outer side of the speed reducing device along the radial direction. While the rotator portion is rotated, the first cycloid disc set is rotated with the first eccentric ring, and the second cycloid disc set is rotated with the second eccentric ring. The first roller assembly and the second roller assembly are not rotatable, but the third roller assembly is rotatable. Consequently, the first cycloid disc set and the second cycloid disc set interact with the first roller assembly, the second roller assembly and the third roller assembly. In such way, the purpose of reducing the speed at two stages can be achieved. Since it is not necessary to use an additional shaft coupling to connect the motor and the speed reducing mechanism, the volume and weight of the speed reducing device are reduced. Due to the two-stage speed reduction, the purpose of achieving the high reduction ratio is achieved. The speed reducing mechanism of the speed reducing device includes the first cycloid disc set and the second cycloid disc set. In comparison with the reducer having a single cycloid disc, the speed reducing device has high rigidity and is capable of withstanding a higher load. Moreover, the first cycloid disc set and the second cycloid disc set are respectively installed on the first eccentric ring and the second eccentric ring that have opposite eccentric directions. Consequently, the speed reducing device is capable of reaching dynamic balance.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A speed reducing device having a power source, comprising:
   a motor served as the power source and comprising:
      a stator portion;
      a shaft portion located at a central part of the stator portion; and
      a rotator portion, wherein the rotator portion is driven to rotate by the stator portion, and the rotator portion comprises a rotator casing assembly, a first eccentric ring and a second eccentric ring, wherein the stator portion is accommodated within a hollow structure of the rotator casing assembly, the first eccentric ring and the second eccentric ring are arranged beside each other and protruded from an outer surface of the rotator casing assembly; and
   a speed reducing mechanism arranged around the motor, and comprising:
      a first cycloid disc set mounted around the first eccentric ring, and comprising at least one first tooth and at least one second tooth;
      a second cycloid disc set mounted around the second eccentric ring, and comprising at least one third tooth and at least one fourth tooth;
      a first roller assembly arranged beside a first side of the motor, and comprising a first reducer casing and plural first rollers, wherein the plural first rollers are arranged on the first reducer casing;
      a second roller assembly arranged beside a second side opposing to the first side of the motor, and comprising a second reducer casing and plural second rollers, wherein the plural second rollers are arranged on the second reducer casing; and
      a third roller assembly arranged between the first roller assembly and the second roller assembly, wherein the motor is covered by the first roller assembly, the second roller assembly and the third roller assembly collaboratively, and the third roller assembly comprises a ring-shaped structure and plural third rollers, wherein the plural third rollers are installed on the ring-shaped structure, wherein the first tooth is contacted with the at least one first roller, the third tooth is contacted with the at least one second roller, and the second tooth and the fourth tooth are contacted with the at least one third roller.

2. The speed reducing device having the power source according to claim 1, wherein an eccentric direction of the first eccentric ring and an eccentric direction of the second eccentric ring are opposite to each other.

3. The speed reducing device having the power source according to claim 1, wherein the first roller assembly and the second roller assembly are not rotated about the shaft portion, wherein while the rotator portion is rotated, the first cycloid disc set is rotated with the first eccentric ring, the second cycloid disc set is rotated with the second eccentric ring, and the third rollers of the third roller assembly are pushed against the corresponding second tooth and the corresponding fourth tooth, so that the third roller assembly is rotated about the shaft portion to drive the ring-shaped structure to rotate and output power.

4. The speed reducing device having the power source according to claim 1, wherein the rotator casing assembly comprises:
   a first rotator casing comprising a ring-shaped wall part, wherein the hollow structure of the rotator casing assembly is defined by an inner space of the ring-shaped wall part, and the stator portion is accommodated within the hollow structure; and
   a second rotator casing having a circular disc structure, wherein a size of the second rotator casing matches a size of the inner space of the ring-shaped wall part, and the inner space of the ring-shaped wall part is covered by the second rotator casing, so that the stator portion is covered by the first rotator casing and the second rotator casing.

5. The speed reducing device having the power source according to claim 4, wherein the speed reducing device further comprises a first braking element and a second braking element, wherein the first braking element is disposed on a lateral surface of the second rotator casing of the rotator casing assembly and arranged beside the second roller assembly, and the second braking element is disposed on a lateral surface of the second reducer casing and arranged beside the second rotator casing, wherein when the first braking element and the second braking element are contacted with each other, the rotation of the rotator portion is limited, wherein when the first braking element and the second braking element are separated from each other, the rotation of the rotator portion is allowed.

6. The speed reducing device having the power source according to claim 4, wherein the shaft portion comprises a first end and a second end, the first rotator casing has a cup-shaped structure with a base part and the ring-shaped wall part, wherein the base part has a first perforation, and the first end of the shaft portion is aligned with and inserted into the first perforation, wherein the ring-shaped wall part is perpendicularly disposed on the base part, wherein the second rotator casing has a second perforation, and the second end of the shaft portion is aligned with and inserted into the second perforation.

7. The speed reducing device having the power source according to claim 1, wherein the first cycloid disc set further comprises a first outer cycloid disc and a first inner cycloid disc, and the second cycloid disc set further comprises a second outer cycloid disc and a second inner cycloid disc, wherein the first outer cycloid disc and the first inner cycloid disc are arranged side by side, the first inner cycloid disc is arranged between the first outer cycloid disc and the second inner cycloid disc, the first tooth is protruded from an outer periphery of the first outer cycloid disc, the second tooth is protruded from an outer periphery of the first inner cycloid disc, the second outer cycloid disc and the second inner cycloid disc are arranged side by side, the second inner cycloid disc is arranged between the first inner cycloid disc and the second outer cycloid disc, the third tooth is protruded from an outer periphery of the second outer cycloid disc, and the fourth tooth is protruded from an outer periphery of the second inner cycloid disc.

8. The speed reducing device having the power source according to claim 7, wherein a tooth profile of the first outer cycloid disc and a tooth profile of the second outer cycloid disc are identical, and a tooth profile of the first inner cycloid disc and a tooth profile of the second inner cycloid disc are identical, wherein a number of the first tooth and a number of the third tooth are equal, and a number of the second tooth and a number of the fourth tooth are equal.

9. The speed reducing device having the power source according to claim 1, wherein a number of the first rollers is equal to a number of the second rollers, the number of the first rollers is at least one more than a number of the first tooth, the number of the second rollers is at least one more than a number of the third tooth, and a number of the third rollers is at least one more than a number of the second tooth or a number of the fourth tooth.

10. The speed reducing device having the power source according to claim 1, wherein the first cycloid disc set comprises a first cycloid disc comprising a first ring-shaped groove, wherein the first tooth is formed on an inner periphery of the first ring-shaped groove and contacted with the at least one first roller, the second tooth is protruded from an outer periphery of the first cycloid disc and contacted with the at least one third roller, and the second cycloid disc set comprises a second cycloid disc comprising a second ring-shaped groove, wherein the third tooth is formed on an inner periphery of the second ring-shaped groove and contacted with the at least one second roller, and the fourth tooth is protruded from an outer periphery of the second cycloid disc and contacted with the at least one third roller.

11. The speed reducing device having the power source according to claim 10, wherein a number of the first tooth and a number of the second tooth are different, and a number of the third tooth and a number of the fourth tooth are different.

* * * * *